United States Patent
Krondorfer et al.

(10) Patent No.: US 8,499,431 B2
(45) Date of Patent: Aug. 6, 2013

(54) PIEZOELECTRIC CLAMPING DEVICE

(75) Inventors: Harald Krondorfer, Aurora, OH (US);
Roland Hund, Zuchwil (CH);
Alexandre Maciel, Campinas (BR)

(73) Assignee: Robert Bosch GmbH, Stuttgart (DE)

( * ) Notice: Subject to any disclaimer, the term of this patent is extended or adjusted under 35 U.S.C. 154(b) by 859 days.

(21) Appl. No.: 12/605,430

(22) Filed: Oct. 26, 2009
(Under 37 CFR 1.47)

(65) Prior Publication Data

US 2011/0095493 A1 Apr. 28, 2011

(51) Int. Cl.
*B23B 31/28* (2006.01)

(52) U.S. Cl.
USPC ............ 29/525.01; 279/8; 279/126; 279/135; 279/141

(58) Field of Classification Search
USPC ... 279/8, 126, 128, 134, 135, 141; 29/525.01
IPC ....................................................... B23B 31/28
See application file for complete search history.

(56) References Cited

U.S. PATENT DOCUMENTS

| | | | | |
|---|---|---|---|---|
| 2,526,208 A | * | 10/1950 | Dowick | 279/8 |
| 3,691,900 A | * | 9/1972 | Novak et al. | 409/233 |
| 4,671,145 A | * | 6/1987 | Fehrenbach et al. | 82/1.11 |
| 4,746,252 A | * | 5/1988 | Jesinger | 409/233 |
| 4,850,154 A | | 7/1989 | Grammer et al. | |
| 4,941,790 A | | 7/1990 | Kirn | |
| 5,042,207 A | | 8/1991 | Kirn | |
| 5,174,179 A | * | 12/1992 | Hiestand | 82/165 |
| 5,314,175 A | | 5/1994 | Izumi et al. | |
| 5,746,422 A | | 5/1998 | Harada et al. | |
| 5,878,495 A | * | 3/1999 | Martens et al. | 29/898.057 |
| 6,227,853 B1 | * | 5/2001 | Hansen et al. | 433/119 |
| 6,870,305 B2 | | 3/2005 | Moler | |
| 7,032,287 B1 | * | 4/2006 | Spady et al. | 29/559 |
| 7,430,104 B2 | * | 9/2008 | Litman et al. | 361/234 |
| 7,641,202 B1 | * | 1/2010 | Dovel | 279/58 |
| 8,277,462 B2 | * | 10/2012 | Heymann et al. | 606/107 |
| 2002/0189111 A1 | | 12/2002 | Krondorfer et al. | |
| 2004/0012160 A1 | | 1/2004 | Krondorfer et al. | |
| 2010/0295258 A1 | * | 11/2010 | Harb et al. | 279/126 |

FOREIGN PATENT DOCUMENTS

| | | | |
|---|---|---|---|
| DE | 10345993 A1 | * | 5/2005 |
| DE | 102008046687 A1 | * | 3/2009 |
| EP | 1604774 A1 | * | 12/2005 |

(Continued)

OTHER PUBLICATIONS

Bosch GWS 14.4V Cordless Angle Grinder, Product Description available at: http://www.tooled-up.com/Product.asp?PID=108331, accessed on: Oct. 23, 2009.
Bosch SDS Clic Quick Change Flange Locking Nut For Angle Grinders, Product Description available at: http://www.tooled-up.com/Product.asp?PID=56536, accessed on: Oct. 23, 2009.
Fein Power Tools Incorporated, Angle Grinder WSB 20-180, Fein General Catalog 2009, 2009, p. 114.

(Continued)

*Primary Examiner* — Eric A Gates
(74) *Attorney, Agent, or Firm* — Maginot, Moore & Beck (57) ABSTRACT

A clamping apparatus has been developed for coupling a tool member to the output shaft of a power tool without the use of auxiliary hands tools or a shaft-lock lever. The clamping apparatus includes a clamp member and a piezoelectric element. The clamp member is coupled to an output shaft of a motor. The piezoelectric element opposes the first clamp member and is configured to change from a first state to a second state in response to being coupled to a source of electrical energy.

15 Claims, 4 Drawing Sheets

FOREIGN PATENT DOCUMENTS

| | | | | |
|---|---|---|---|---|
| JP | 01071604 | A | * | 3/1989 |
| JP | 01199707 | A | * | 8/1989 |
| JP | 05245708 | A | * | 9/1993 |
| JP | 2005288604 | A | * | 10/2005 |
| JP | 2009045725 | A | * | 3/2009 |
| WO | WO 2005063447 | A1 | * | 7/2005 |

OTHER PUBLICATIONS

Porter Cable 325MAG 15A 7.25 Inch Circular Saw, Product Description available at: http://www.amazon.com/Porter-Cable-325MAG-4-Inch-Circular-Blade/dp/B0001GUEH2, accessed on: Oct. 23, 2009.

* cited by examiner

PIEZOELECTRIC CLAMPING DEVICE

FIELD OF THE INVENTION

The present invention relates to power tools and, more particularly, to clamping devices for power tools.

BACKGROUND OF THE INVENTION

Power tools can be used to perform many tasks that were previously performed with hand tools. For instance, some power tools may be used to cut, grind, or polish materials including metal, wood, and stone. These types of power tools often include a motor configured to rotate a tool shaft. The tool shaft may be the output shaft of the motor; alternatively, a transmission may rotatably couple the tool shaft to the output shaft of the motor. The tool shaft of some power tools is terminated with a clamping device for connecting an approximately disk-shaped tool to the tool shaft. When clamped to the tool shaft, the disk-shaped tool rotates with the tool shaft. Depending on the type of disk-shaped tool, a user may cut, grind, or polish a workpiece by contacting the workpiece with the rotating disk-shaped tool.

The clamping device of some power tools requires at least one auxiliary hand tool to connect the disk-shaped tool to the tool shaft. Specifically, clamping devices often include a fastening member, such as a bolt, which is threadingly engaged to a free end of the tool shaft. A first auxiliary tool, usually a wrench, is used to tighten the bolt. When the bolt is tightened a compressive force is exerted upon the disk-shaped tool to couple the tool to the tool shaft for rotation with the tool shaft. The rotational force applied to the bolt, however, is often transmitted to the tool shaft causing the tool shaft to rotate, thereby limiting the torque that may applied to the bolt. Accordingly, many power tools include a shaft-lock lever, which selectively prevents the tool shaft from rotating and permits the bolt to be tightened to a desired torque. Instead of a shaft-lock lever some power tools require a second auxiliary tool, such as a second wrench, to hold the tool shaft in a stationary position as the bolt is tightened with the first wrench. A disk-shaped tool is removed from the tool shaft by securing the rotational position of the tool shaft with either the shaft-lock lever or the second wrench and then loosening the bolt with the first wrench.

The above-described clamping device works sufficiently well for coupling a disk-shaped tool to a tool shaft of a power tool, however, further advancements are possible. For instance, some users may misplace or lose the auxiliary tools required to operate the clamping device. Additionally, some users may use the auxiliary tools to over-tighten or under-tighten the bolt, resulting in the power tool operating with less efficiency. Therefore, what is needed is a clamping device capable of clamping a disk-shaped tool to a tool shaft of a power tool without the need for auxiliary hand tools. What is also needed is a clamping device, which consistently applies a desired level of compressive force to a disk-shaped tool coupled to the tool shaft of a power tool. For these reasons and others, further advancements in the area of clamping devices for power tools are desirable.

SUMMARY

According to one embodiment of the present disclosure a clamping apparatus for coupling a tool to an output shaft of a power tool is provided. The clamping apparatus includes a clamp member and a piezoelectric element. The clamp member is coupled to an output shaft of a motor. The piezoelectric element opposes the first clamp member and is configured to change from a first state to a second state in response to being coupled to a source of electrical energy.

According to another embodiment of the present disclosure a clamping apparatus for coupling a tool member to a power tool is provided. The clamping apparatus includes a piezoelectric member, a first clamp member, and a second clamp member. The piezoelectric member is supported on an output shaft of a power tool, and is configured to change from a first state to a second state in response to being coupled to a source of electrical energy and to generate a clamping force in response to being in the second state. The first clamp member and the second clamp member are supported on the output shaft. The second clamp member is configured to impart the clamping force upon the tool member supported on the output shaft between the first clamp member and the second clamp member.

According to another embodiment of the present disclosure a method of coupling and decoupling a tool is provided. The method includes positioning a tool member on an output shaft of a power tool between a clamp member and a piezoelectric element. The method further includes coupling a source of electrical energy to the piezoelectric element to cause the piezoelectric element to impart a clamping force upon the tool member.

BRIEF DESCRIPTION OF THE FIGURES

The foregoing aspects and other features of the present disclosure are explained in the following description, taken in connection with the accompanying figures.

Corresponding reference numerals and characters indicate corresponding parts throughout the several figure views.

DETAILED DESCRIPTION

Figure 1:
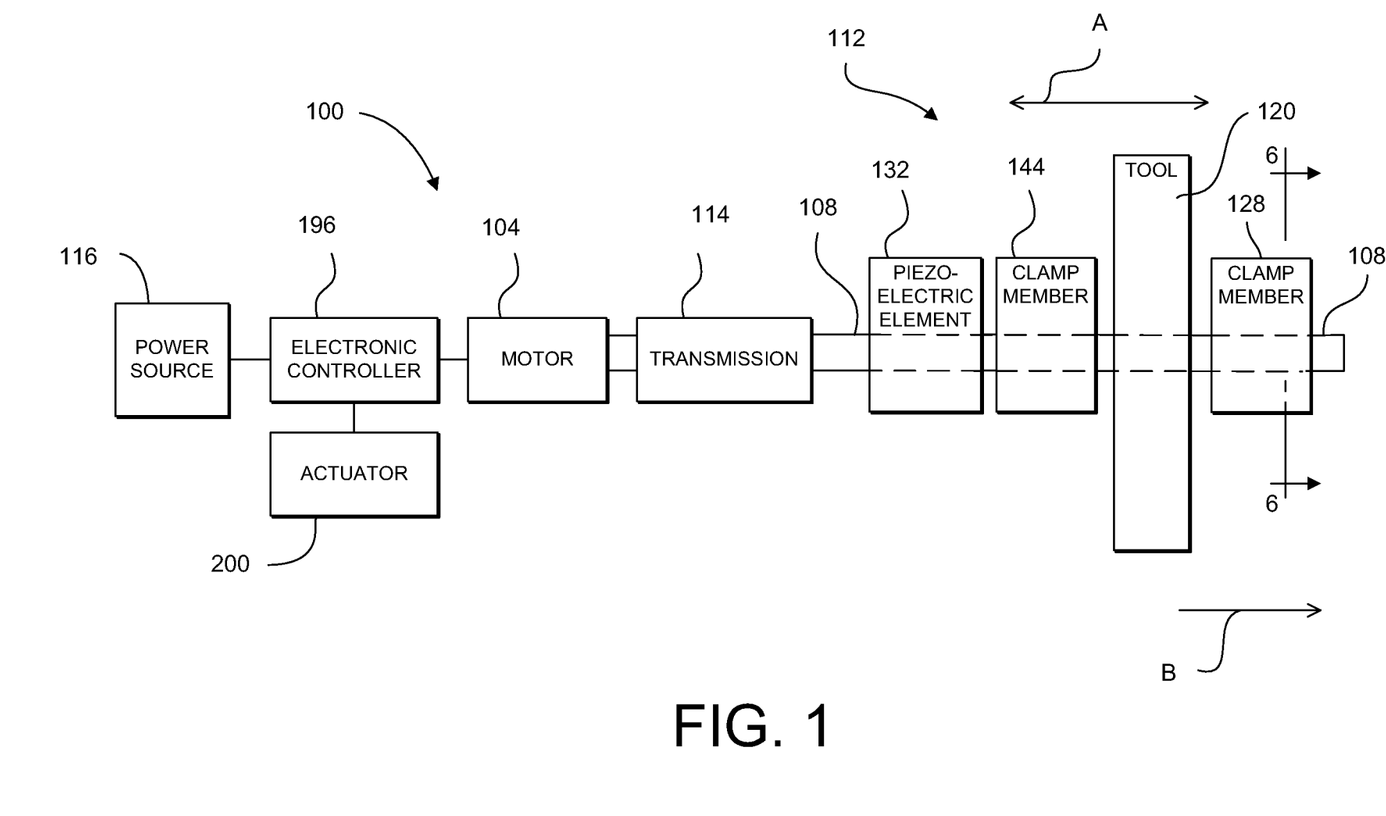
FIG. 1 illustrates a block diagram of power tool configured for use with a piezoelectric clamping device.

Referring to FIG. 1, a block diagram of an exemplary power tool 100 configured for use with a piezoelectric clamping device 112 is shown. The power tool 100 is representative of numerous power tools including, but not limited to, angle grinders, circular saws, and miter saws. The power tool 100 includes, among other components, a motor 104, an output shaft 108, and a clamping device 112. The motor 104 may be an electrical or pneumatic motor configured to rotate the output shaft 108 either directly or through a transmission 114. The clamping device 112 couples a tool 120 to the output shaft 108 for rotation with the output shaft 108. The tool 120 is any type of cutting, grinding, or polishing tool including, but not limited to, a saw blade or an angle grinder disk. As described below, an auxiliary tool, such as a wrench, is not required to couple the tool 120 to the output shaft 108 or to decouple the tool 120 from the output shaft 108.

Figure 2:
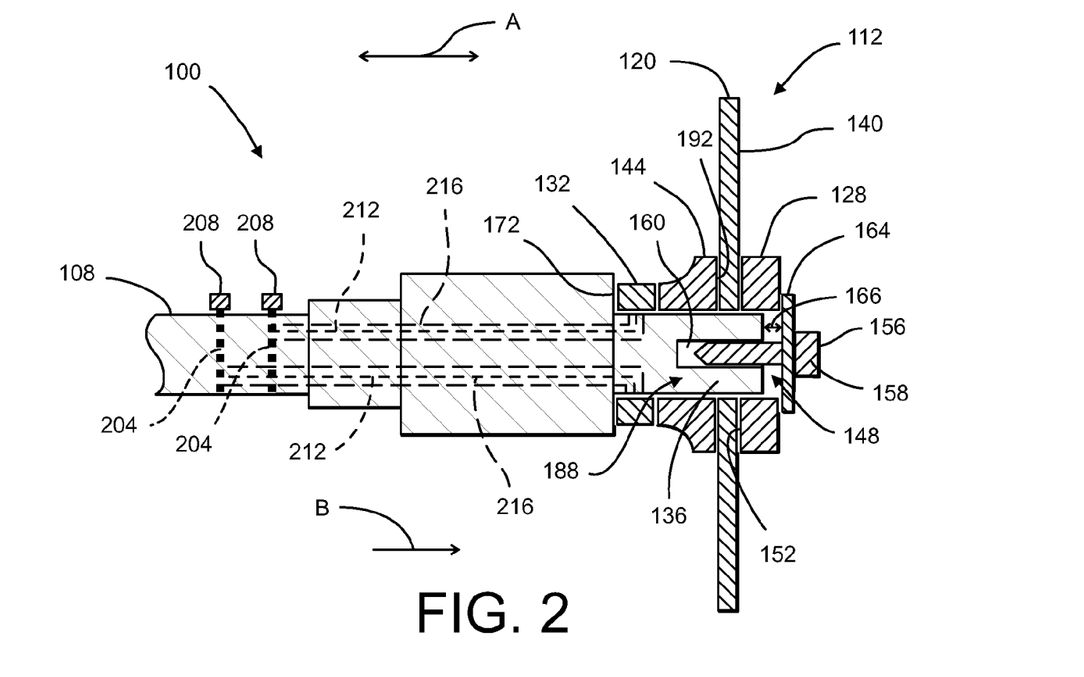
FIG. 2 illustrates a cross-sectional view of the piezoelectric clamping device positioned on the power tool of FIG. 1.

The clamping device 112 provides a mechanical clamping force when coupled to an electrical power source 116 or other source of electrical energy. Referring now to FIG. 2, the clamping device 112 includes a first clamp member 128, a second opposing clamp member 144, and a piezoelectric element 132. The clamping device 112 couples a tool 120 to the output shaft 108 between the first clamp member 128 and the second clamp member 144.

In the embodiment of FIG. 2, the first clamp member 128 is provided as a washer-like element having a clamping surface referred to as face 152. The second clamp member 144 is provided as a generally cylindrically-shaped element having a clamping surface referred to as face 192. The face 152, 192 of each clamp member 128, 144 is forcefully pressed against and frictionally engages the tool 120 in response to the piezoelectric element 132 becoming coupled to the electrical power source 116.

The first clamp member 128 is removably connected to a free end 136 of the output shaft 108. The first clamp member 128 includes a central opening 148 having a diameter slightly larger than a diameter of the free end 136 of the output shaft 108 to permit the first clamp member 128 to slide in an axial direction (represented by Line A of FIGS. 1 and 2) along the output shaft 108. The face 152 is configured to contact a central portion of the tool 120 and is perpendicular or approximately perpendicular to the axial direction A.

The second clamp member 144 is removably connected to the free end 136 of the output shaft 108 between the tool 120 and the piezoelectric element 132 to prevent the piezoelectric element 132 from contacting directly the tool 120. The second clamp member 144 includes a central opening 188 that permits the second clamp member 144 to slide in the axial direction A along the output shaft 108. In the illustrated embodiment, face 192 extends radially from the output shaft 108 approximately the same distance that the piezoelectric element 132 extends radially from the output shaft 108, to enable the second clamp member 144 to transfer the clamping force generated by the piezoelectric element 132 to the tool 120.

As shown in FIG. 2, a fastening member, such as a bolt 156, is removably connected to the free end 136 of the output shaft 108. The bolt 156 may be threadingly engaged with a threaded opening 160 in the output shaft 108. A washer 164 or an extended portion of the bolt head 158 provides a backstop for the first clamp member 128. The diameter of the washer 164 is larger than the central opening 148 of the first clamp member 128. When the bolt 156 is connected to the output shaft 108 the first clamp member 128 may slide in direction B, of FIGS. 1 and 2, until the clamp member 128 contacts the washer 164, at which point the washer 164 prevents the clamp member 128 from sliding any further in direction B.

As shown in the embodiment of FIG. 2, the bolt 156 does not contact the free end 136 of the output shaft 108. Gap 166 between the washer 164 and the free end 136 enables the bolt 156 to be tightened until any gaps between a shoulder 172 of the output shaft 108, the piezoelectric element 132, the first clamp member 128, the tool 120, the second clamp member 144, and the washer 164 are closed. Therefore, when the bolt 156 is hand-tightened to the output shaft 108, gap 166 remains; however, there is little to no space between the piezoelectric element 132, the first clamp member 128, the tool 120, the second clamp member 144, and the washer 164.

The bolt 156 may be connected to the output shaft 108 and removed from the output shaft 108 by hand without requiring the use of an auxiliary tool 120, such as a wrench or spanner. The bolt head 158 includes a gripping surface to be grasped when connecting and removing the bolt 156.

The clamping device 112 may include a nut (not illustrated) configured to engage threadingly an outer surface of the output shaft 108, instead of the bolt 156. For instance, a wing nut may be provided that may be connected to and removed from the output shaft 108 by hand.

The piezoelectric element 132 is coupled to the output shaft 108 and is configured to rotate with the shaft 108. In response to being coupled to the power source 116, the piezoelectric element 132 tends to deform mechanically. The clamping device 112, however, prevents the piezoelectric element 132 from deforming. In particular, as described above, hand tightening the bolt 156 to the output shaft 108 closes the gaps between the elements mounted upon the output shaft 108 leaving essentially no space for axial expansion of the piezoelectric element 132. Additionally, each of the elements mounted upon the output shaft 108 are formed of a material configured to resist a compressive force. Accordingly, in response to being coupled to the power source 116 the piezoelectric element 132 tends to deform but does not exhibit any significant deformation. Instead, the tendency of the piezoelectric element 132 to deform generates a clamping force that presses the first clamp member 128 and the second clamp member 144 against the tool 120. In response to being decoupled from the power source 116, the tendency of the piezoelectric element 132 to deform is eliminated, thereby also eliminating the clamping force, and enabling the bolt 156 and the tool 120 to be removed from the output shaft 108 by hand.

Figure 3:
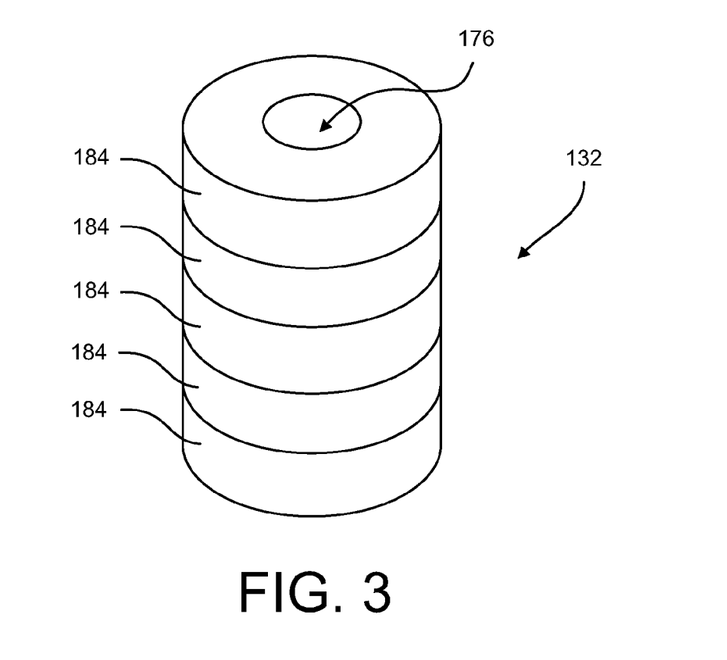
FIG. 3 illustrates a perspective view of a piezoelectric element for use with the clamping device of FIG. 2.

Shown in cross section in FIG. 2, the piezoelectric element 132 is a ring-shaped element seated against the shoulder 172 of the output shaft 108. The piezoelectric element 132 has a central opening 176, shown in FIG. 3, which is slightly larger than the diameter of the free end 136 of the output shaft 108. In order to develop a suitable clamping force, the piezoelectric element 132 may include a plurality of thin layers 184 of piezoelectric material. As is known, piezoelectric material exhibits a change in length or width in response to being coupled to a source of electrical energy. Those skilled in the art recognize that the volume of the piezoelectric material remains approximately the same in response to the piezoelectric material being coupled to a source of electrical energy. The overall change in length or width of a piezoelectric element may be increased by forming an element with numerous layers of piezoelectric material each configured to change in size in response to being coupled to a source of electrical energy. By way of non-limiting example, a single piezoelectric layer may expand 10 micrometers ("μm") when coupled to a source of electrical energy. A piezoelectric element may be constructed consisting of twenty of the aforementioned piezoelectric layers stacked upon one another. When the stacked piezoelectric element is coupled to a source of electrical energy each layer expands 10 μm, resulting in the stacked piezoelectric element expanding a total of 200 μm. In response to being positioned in a confined space that resists the expansion of the piezoelectric element, the piezoelectric element exerts a clamping force that is related to the amount of expansion exhibited by an unconfined piezoelectric element. Accordingly, by forming a piezoelectric element 132 with a plurality of piezoelectric layers 184 a clamping device 112 may be developed having a desired clamping force that is appropriate for the particular power tool 100 to which it is coupled.

The clamping force of the piezoelectric element 132 is also controlled by regulating the power source 116. As is known, the deformation exhibited by a piezoelectric element is related to the magnitude of the voltage applied to the element. Accordingly, by regulating the power source 116, the clamping force exerted on a tool 120 may be controlled. For instance, if a particular tool 120 requires a strong clamping force the voltage level coupled to the piezoelectric element 132 may be increased. The power tool 100 may include a selector (not illustrated) for controlling the voltage level applied to the piezoelectric element 132.

The clamping device 112 clamps a tool 120 to the output shaft 108 with a controlled slip torque. Slip torque refers to a torque exerted upon the tool 120 that causes the tool 120 to rotate relative to the output shaft 108. For instance, if a tool 120 is forcibility placed in contact with a workpiece the frictional force between the tool 120 and the workpiece may exceed the frictional force between the tool 120 and the clamping device 112 causing the output shaft 108 to rotate relative to the tool 120. The clamping device 112 couples the tool 120 to the output shaft 108 with an adjustable slip torque. Specifically, by regulating the magnitude of the power source 116 coupled to the piezoelectric element 132, the clamping force upon the tool 120 is easily adjusted. An increased clamping force results in a higher slip torque rating, whereas a decreased clamping force results in a lower slip torque rating.

The clamping device 112 imparts an approximately equal clamping force upon tools 120 having a thickness within a range of thicknesses. As described above, in response to the bolt 156 being hand tightened, any gaps which may exist between the elements mounted upon the output shaft 108 are closed. It is from this configuration that the piezoelectric element 132 applies the clamping force. Thus, because tightening the bolt 156 closes the gaps between the elements mounted upon the output shaft 108, when the piezoelectric element 132 is coupled to the power source 116, it applies a clamping force to the tool 120 that is independent of the thickness of the tool 120.

Referring again to the embodiment illustrated in FIG. 1, the clamping device 112 includes an electronic controller 196 for controlling the piezoelectric element 132 and the motor 104. In particular, the controller 196 includes circuitry for controlling when the piezoelectric element 132 and the motor 104 are energized and deenergized in response to the position of an actuator 200. In a first embodiment, the actuator 200 is movable between an "off" position and an "on" position. In response to the actuator 200 moving from the off position to the on position, the controller 196 couples the piezoelectric element 132 to the power source 116 and initiates a first predetermined time period. Thus, the clamping device 112 secures the tool 120 to the output shaft 108 before the motor 104 is energized. If the actuator 200 remains in the on position until the expiration of the first predetermined time period, the controller 196 couples the motor 104 to the power source 116 to initiate rotation of the output shaft 108. The piezoelectric element 132 remains coupled to the power source 116 the entire time the motor 104 is coupled to the power source 116. The length of the first predetermined time period is determined by the time required by the piezoelectric element 132 to generate the clamping force. An exemplary first predetermined time period may be approximately ten to one hundred milliseconds. In response to the actuator 200 moving from the on position to the off position, the controller 196 deenergizes the motor 104 and initiates a second predetermined time period. If the actuator 200 remains in the off position until the expiration of the second predetermined time period, the controller 196 decouples the piezoelectric element 132 from the power source 116. The second predetermined time period is determined by the time required for the output shaft 108 to come to a complete rotational stop after the motor 104 is deenergized. Accordingly, the time period is at least partially based on the characteristics of the motor 104 and the mass of the tool 120 coupled to the shaft 108. An exemplary second predetermined time period may be three to twenty five seconds. Therefore, the controller 196 ensures that the clamping device 112 is engaged whenever the output shaft 108 is rotating.

In a second embodiment the actuator 200 is movable between a first, a second, and a third position. The actuator 200 is biased in the first position (the "off" position). The actuator 200 may enter the second position at approximately a midpoint of a range of movement of the actuator 200. The actuator 200 enters the third position in response to the actuator 200 being moved to an endpoint of the range of movement. The controller 196 is configured to operate with the above described three-position actuator 200, as well as other three-position actuators 200 in the following manner. In response to the actuator 200 moving from the first position to the second position, the controller 196 couples the piezoelectric element 132 to the power source 116. In response to the actuator 200 moving from the second position to the third position, the controller 196 energizes the motor 104 to initiate rotation of the output shaft 108. Because the actuator 200 may not be moved directly from the first position to the third position, the actuator 200 ensures that the clamping device 112 is engaged before the motor 104 is energized. In response to the actuator 200 moving from the third position to the second position, the controller 196 deenergizes the motor 104. In response to the actuator 200 moving from the second position to the first position, the controller 196 decouples the piezoelectric element 132 from the power source 116. Alternatively, in response to the actuator 200 moving from the second position to the first position, the controller 196 decouples the piezoelectric element 132 from the power source 116 at the expiration of a predetermined time period, which is approximately equal to the time required for the output shaft 108 to stop rotating.

The power tool 100 includes at least two contact rings 204 to couple the power source 116 and/or the electronic controller 196 to the piezoelectric element 132. The contact rings 204 circumvent the output shaft 108. The rings 204 are formed of a conductive material and are insulated from each other and the remainder of the output shaft 108. Each ring 204 is configured to contact a brush 208 for coupling the rings 204 to the electronic controller 196 or the power source 116. Within the output shaft 108 conductors 212 extend from the rings 204 to the piezoelectric element 132 through one or more channels 216 that are electrically isolated from one another. The contact rings 204 are located upon the output shaft 108 in a region, which remains free from grease and other lubricants.

Figure 4:
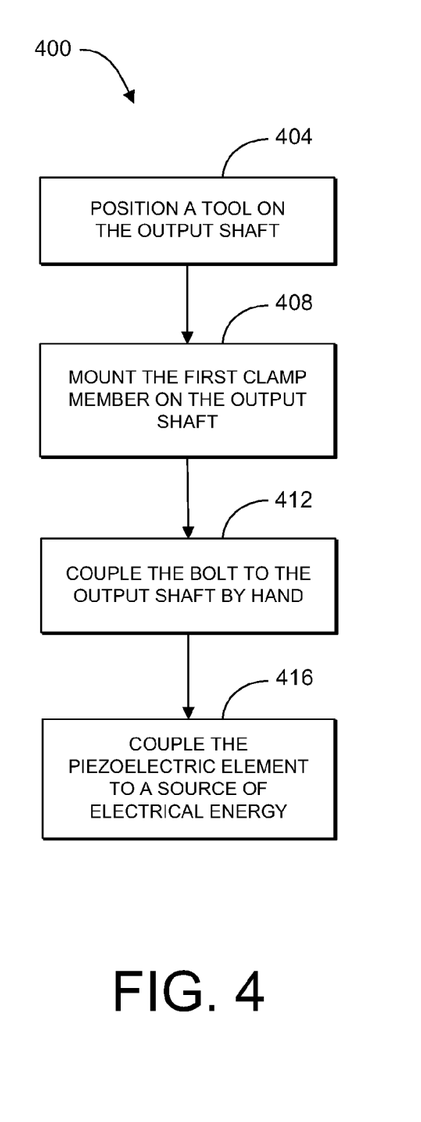
FIG. 4 illustrates a flowchart depicting an exemplary method for coupling a tool to an output shaft of a power tool with the clamping device of FIG. 2.

The embodiment of the clamping device 112 illustrated in FIG. 2 may be operated according to a method 400 illustrated by the flowchart of FIG. 4. The method 400 of FIG. 4 couples a tool 120 to an output shaft 108 of a power tool 100. First, the second clamp member 144 is mounted upon the output shaft 108 against the piezoelectric element 132. Next, as shown by blocks 404 and 408, the tool 120 is mounted upon the output shaft 108, followed by the first clamp member 128. Subsequently, the bolt 156 is threadingly engaged with the opening in the output shaft 108, as shown by block 412. The bolt 156 is hand tightened to close the gaps between the elements mounted upon the output shaft 108. Neither an auxiliary hand tool, such as a wrench, nor a shaft-lock lever is required to tighten the bolt 156 to a torque that closes the gaps. Next, as shown in block 416, the piezoelectric element 132 is coupled to a power source 116, thereby causing the piezoelectric element 132 to impart a clamping force upon the tool 120 to couple the tool 120 to the output shaft 108 for rotation with the output shaft 108. When the tool 120 is coupled to the output shaft 108, the tool 120 may be forced against a workpiece to enable the tool 120 to perform an intended function, such as cutting a workpiece.

Figure 5:
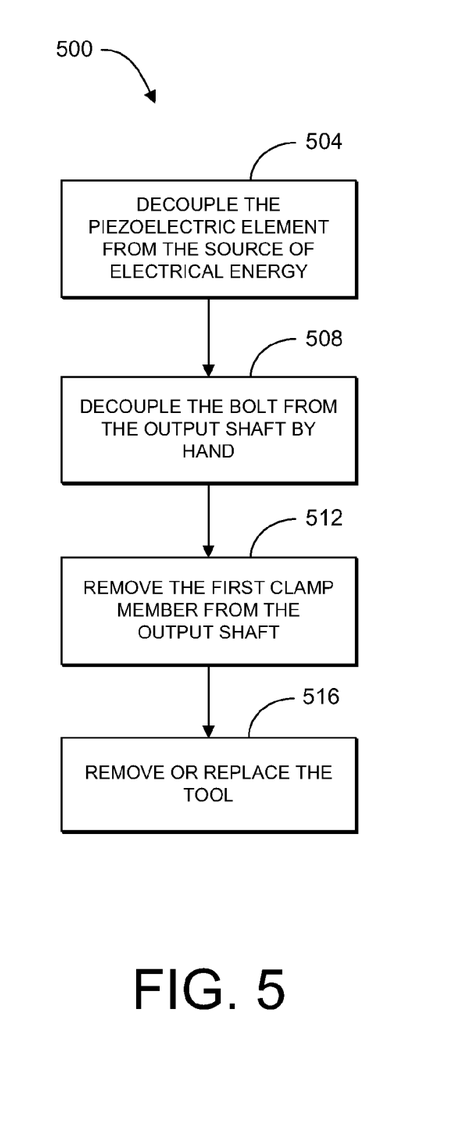
FIG. 5 illustrates a flowchart depicting an exemplary method for decoupling a tool from the output shaft of a power tool configured for use with the clamping device of FIG. 2.

A tool 120 is removed from the output shaft 108 of the power tool 100 according to a method 500 illustrated by the flowchart of FIG. 5. As shown in block 504, to remove the tool 120 from the output shaft 108 the piezoelectric element 132 is decoupled from the power source 116. As described above, in response to becoming decoupled from the power source 116 the piezoelectric element 132 releases the clamping force upon the tool 120. Next as shown in block 508, the bolt 156 is removed by hand from the output shaft 108. Neither a shaft-lock lever nor an auxiliary tool is required to remove the bolt 156 from the output shaft 108. Subsequently, as shown in blocks 512 and 516, the first clamp member 128 and the tool 120 are removed from the output shaft 108.

Figure 6:
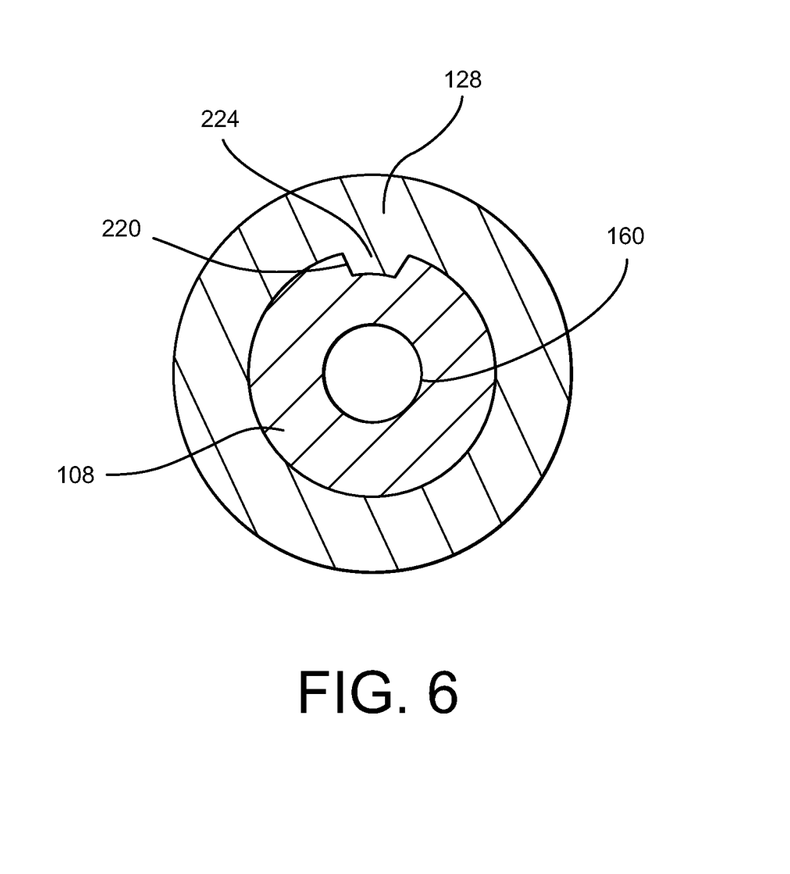
FIG. 6 illustrates a cross sectional view of the piezoelectric clamping device along line 6-6 of FIG. 1.

In an alternative embodiment of the clamping device 112, the piezoelectric element 132, the first clamp member 128, and the second clamp member 144 are secured against rotation with respect to the output shaft 108. As shown in the exemplary embodiment of FIG. 6, the output shaft 108 includes a longitudinal groove 220. The groove 220 extends from at least the shoulder 172 to the free end 136 of the output shaft 108. Each of the piezoelectric element 132, the first clamp member 128, and the second clamp member 144 include a tab 224 configured to engage the groove 220. The tabs 224 prevent the piezoelectric element 132, the first clamp member 128, and the second clamp member 144 from rotating with respect to the output shaft 108. The tabs 224 also prevent the bolt 156 from tightening in response to rotation of the second clamp member 144.

Although a power tool 100 has been described with respect to certain preferred embodiments, it will be appreciated by those of skill in the art that other implementations and adaptations are possible. For example, the piezoelectric element 132 may be one or more block-shaped segments positioned around the output shaft 108 upon a support structure (not illustrated). Moreover, there are advantages to individual advancements described herein that may be obtained without incorporating other aspects described above. Therefore, the spirit and scope of the appended claims should not be limited to the description of the preferred embodiments contained herein, and the claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from the applicants, patentees, and/or others.

What is claimed is:

1. A clamping apparatus for coupling a tool member to an output shaft of a power tool, the clamping apparatus comprising:
   a clamp member coupled to an output shaft;
   a piezoelectric element opposing the clamp member, the piezoelectric element configured to change from a first state to a second state in response to being coupled to a source of electrical energy; and
   a controller electrically coupled to the piezoelectric element, the controller including an actuator movable between a first position and a second position, wherein in response to the actuator moving from the first position to the second position the controller (i) couples the piezoelectric element to the source of electrical energy and (ii) energizes a source of rotation to rotate the output shaft after a first predetermined time period, and
   in response to the actuator moving from the second position to the first position the controller (i) deenergizes the source of rotation and (ii) decouples the piezoelectric element from the source of electrical energy after a second predetermined time period.

2. The clamping apparatus of claim 1, further comprising:
   a first tab coupled to the piezoelectric element and configured to engage a longitudinal groove in the output shaft, the first tab configured to prevent the piezoelectric element from rotating with respect to the output shaft; and
   a second tab coupled to the clamp member and configured to engage the longitudinal groove in the output shaft, the second tab configured to prevent the clamp member from rotating with respect to the output shaft.

3. The clamping apparatus of claim 1, further comprising:
   a first contact ring and a second contact ring mounted on the output shaft;
   a first conductor electrically coupled to the first contact ring and the piezoelectric element, a portion of the first conductor extending through a first channel in the output shaft; and
   a second conductor electrically coupled to the second contact ring and the piezoelectric element, a portion of the second conductor extending through a second channel in the output shaft.

4. The clamping apparatus of claim 1, the clamp member removably connected to a free end of the output shaft.

5. The clamping apparatus of claim 1, wherein a tool member is positioned between the piezoelectric element and the clamp member, and the piezoelectric element is configured to impart a clamping force upon the tool member.

6. The clamping apparatus of claim 1, wherein the clamp member is a first clamp member, further comprising:
   a second clamp member coupled to the output shaft between the first clamp member and the piezoelectric element, the second clamp member configured to impart a clamping force upon a tool member when the tool member is positioned between the first clamp member and the second clamp member.

7. The clamping apparatus of claim 6, the clamping force coupling the tool member to the output shaft for rotation with the output shaft.

8. The clamping apparatus of claim 1, the piezoelectric element formed from a plurality of ring-shaped piezoelectric members, the ring-shaped piezoelectric members having a central opening with a diameter no less than a diameter of the output shaft.

9. A clamping apparatus for coupling a tool member to a power tool, comprising:
   a piezoelectric member supported on an output shaft of a power tool, the piezoelectric member configured to change from a first state to a second state in response to being coupled to a source of electrical energy and to generate a clamping force in response to being in the second state;
   a first clamp member supported on the output shaft;
   a second clamp member supported on the output shaft, the second clamp member configured to impart the clamping force upon a tool member supported on the output shaft between the first clamp member and the second clamp member; and
   a controller electrically coupled to the piezoelectric member, the controller including an actuator movable between a first, a second, and a third position, wherein in response to the actuator moving from the first position to the second position the controller couples the piezoelectric member to the source of electrical energy, in response to the actuator moving from the second position to the third position the controller energizes a source of rotation to rotate the output shaft, in response to the actuator moving from the third position to the second position the controller deenergizes the source of rotation, and in response to the actuator moving from the second position to the first position the controller decouples the piezoelectric member from the source of electrical energy after a predetermined period of time.

10. The clamping apparatus of claim 9, further comprising:
a fastening member removably connectable to a free end of the output shaft, wherein connecting the fastening member to the output shaft closes at least a first gap between a shoulder of the output shaft and the piezoelectric member, a second gap between the piezoelectric member and the second clamp member, a third gap between the second clamp member and the tool member, and a fourth gap between the tool member and the first clamp member.

11. The clamping apparatus of claim 10, the fastening member further comprising:
a gripping member configured to be grasped while connecting by hand the fastening member to the output shaft.

12. A method of coupling and decoupling a tool member to an output shaft of a power tool, the method comprising:
positioning a tool member on an output shaft of a power tool between a clamp member and a piezoelectric element; and coupling a source of electrical energy to the piezoelectric element to cause the piezoelectric element to impart a clamping force upon the tool member, wherein the coupling a source of electrical energy to the piezoelectric element, includes moving an actuator to a first position, the actuator being electrically coupled to a controller, and wherein in response to the actuator moving to the first position the controller (i) couples the source of electrical energy to the piezoelectric element and (ii) energizes a source of rotation to rotate the output shaft.

13. The method of claim 12, further comprising:
coupling by hand a fastening member to the output shaft of the power tool to close at least a first gap between a shoulder of the output shaft and the piezoelectric element, a second gap between the piezoelectric element and the tool member, and a third gap between the tool member and the clamp member.

14. The method of claim 12, further comprising:
causing the output shaft to cease rotation;
decoupling the piezoelectric element from the source of electrical energy a predetermined time period after the output shaft has ceased to rotate;
removing by hand the fastening member from the output shaft; and
removing by hand the tool member from the output shaft.

15. The method of claim 12, further comprising:
moving an actuator to a second position, wherein in response to the actuator moving to the second position the controller (i) decouples the source of electrical energy from the source of rotation and (ii) decouples the piezoelectric element from the source of electrical energy after a predetermined time period elapses.

* * * * *